United States Patent [19]

Koerner

[11] Patent Number: 5,048,158

[45] Date of Patent: Sep. 17, 1991

[54] KEEPER FOR COILED ITEMS

[76] Inventor: Robert Koerner, 1130 E. 3d St., Coal City, Ill. 60416

[21] Appl. No.: 464,072

[22] Filed: Jan. 12, 1990

[51] Int. Cl.$^5$ ............................................. A44B 18/00
[52] U.S. Cl. ................................. 24/16 R; 24/16 PB; 24/17 AP; 24/442
[58] Field of Search ................ 24/16 R, 16 PB, 17 R, 24/17 AP, 306, 442; 128/DIG. 15, DIG. 26; 2/DIG. 6

[56] References Cited

U.S. PATENT DOCUMENTS

| | | | |
|---|---|---|---|
| 3,654,669 | 4/1972 | Fulton | 24/16 PB |
| 3,835,505 | 9/1974 | Shewbridge | 24/16 R |
| 3,913,179 | 10/1975 | Rhee | 24/16 PB |
| 3,947,927 | 4/1976 | Rosenthal | 24/16 R |
| 4,213,548 | 7/1980 | Wood | 2/DIG. 6 |
| 4,466,159 | 8/1984 | Burrage | 24/17 AP |
| 4,526,756 | 7/1985 | Wong | 24/17 AP |
| 4,815,172 | 3/1989 | Ward | 24/16 R |
| 4,854,015 | 8/1989 | Shaull | 24/16 R |
| 4,893,381 | 1/1990 | Frankel | 24/16 R |

FOREIGN PATENT DOCUMENTS

| | | | |
|---|---|---|---|
| 209245 | 5/1960 | Austria | 24/16 PB |
| 917217 | 8/1954 | Fed. Rep. of Germany | 24/16 PB |
| 698696 | 10/1953 | United Kingdom | 24/17 AP |

Primary Examiner—Victor N. Sakran
Attorney, Agent, or Firm—Ernest Kettelson

[57] ABSTRACT

A keeper for coiled items such as electrical cord, garden hose or the like, having a first smaller loop to receive a single strand to secure the keeper thereto and a second larger loop to extend around all of the coiled strands to keep them together when the electrical cord, garden hose or the like is rolled up into a coil. The keeper comprises a single flexible strap having cooperative loops and hooks on opposite sides throughout to form the second larger loop and a slot near one end to receive the opposite end through to form the first smaller loop.

7 Claims, 5 Drawing Sheets

FIG. 1
FIG. 2
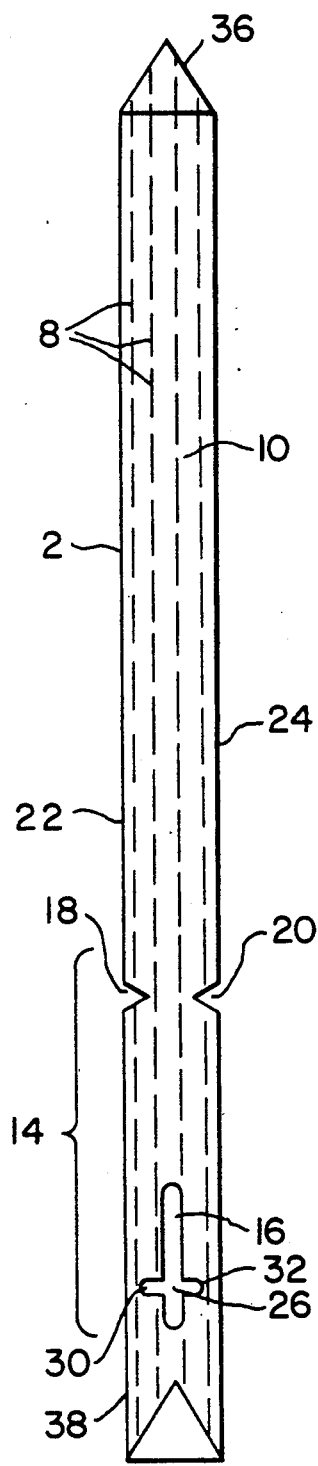
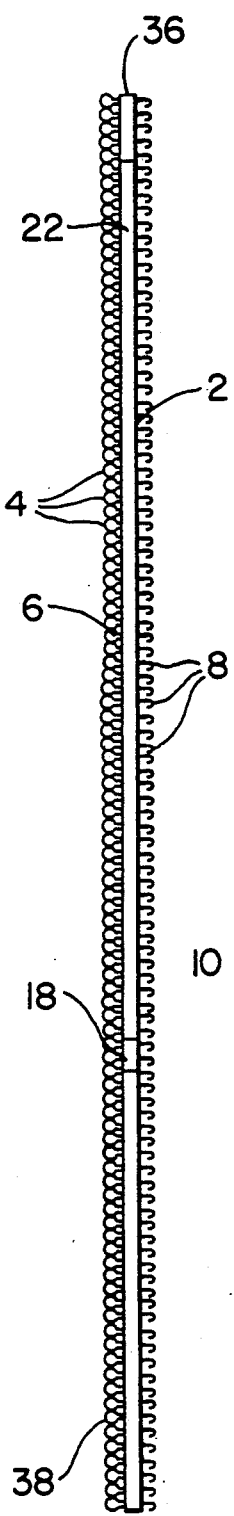

FIG. 3
FIG. 4
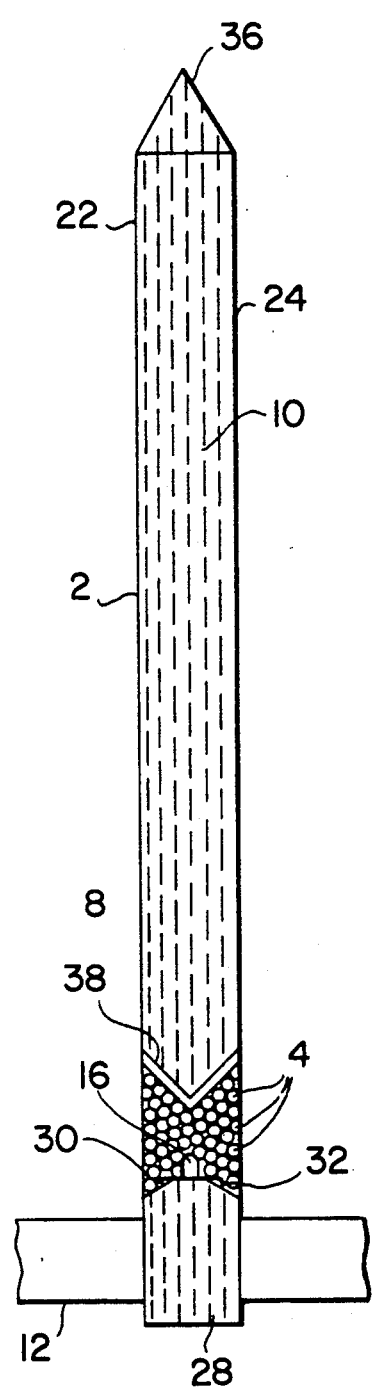
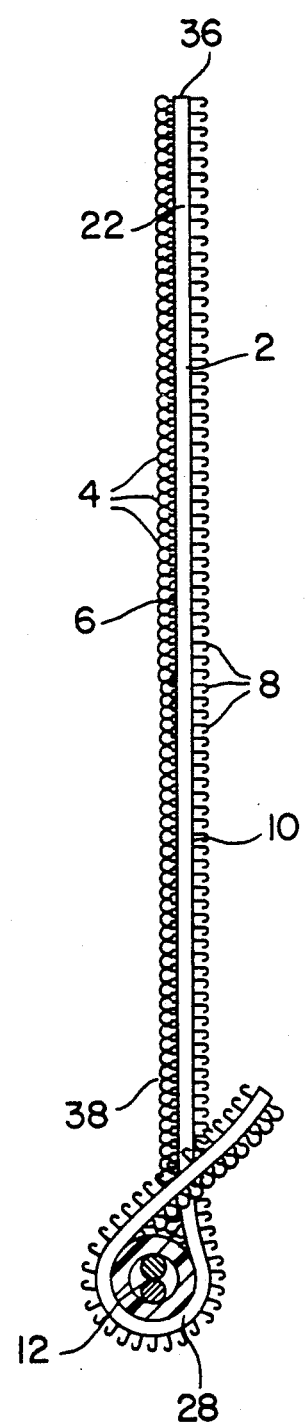

KEEPER FOR COILED ITEMS

BACKGROUND OF THE INVENTION

This invention relates to the field of ties or fastening devices for bundles of gathered items, such as cords, strands, garden hose and the like. In particular, it relates to a keeper for coiled items such as a coil of electrical cord, garden hose and the like which can keep the items held together neatly in a coil but which is readily separable to release the items from the coil when ready for use.

Prior art devices of this kind which are known to the inventor of this invention include those disclosed in the following U.S. Patents.

U.S. Pat. No. 4,815,172 discloses a fastening device for items in a bundle or coil comprising an elongated strap having one surface covered with hooks, the opposite surface having a short section of loops at each opposite end and a short section of hooks at an intermediate location between the loop sections at each opposite end. One loop section at one end of the strap is folded over to connect with the intermediate hook section on the same side of the strap enclosing one strand of the bundle by the loop formed thereby. The second loop section at the other end of the strap is brought around the entire bundle to face the opposite side of the strap having the hooks thereon to which it connects thereby encompassing the entire bundle within the larger loop formed by bringing the second loop section around to connect with the hooks on the opposite surface of the strap.

U.S. Pat. No. 4,780,936 discloses a fastening strap secured to the tongue of a shoe, having Velcro elements on opposite end portions and on opposite sides of the strap to form a loop around the knotted shoe laces and connect the opposite ends of the strap together.

U.S. Pat. No. 4,700,432 discloses a strap having Velcro elements on opposite end portions and on opposite sides to wrap a bundle of wires or other items, and a ratchet tooth tie connected at one end of the strap. The ratchet tooth tie is used to secure the device to one strand of the bundle. The opposite ends of the strap are brought around the entire bundle and connected together by the interconnecting Velcro elements.

U.S. Pat. No. 3,383,738 discloses a chair tie, comprising two spaced apart straps having a block member therebetween forming opposed receiving channels to receive upwardly extending elongated members of adjacent chairs, after which the straps are wrapped around the elongated members and secured by interconnecting fibrous elements provided on the facing surfaces of the straps.

U.S. Pat. No. 3,372,438 discloses a peel resistant tape assembly in which a separate tab member is affixed to a strap having cooperative interconnecting members inwardly from its outer end. The separate tab then overlies the outer end of the interconnected strap and extends beyond to intercept and abut against anything that would otherwise rub against the outer end of the strap causing it to begin to peel away. The separate tab thus deflects the peeling force from the outer end of the strap whereby only shearing force is applied to the interconnected outer end region of the strap. The interconnecting elements of the strap can resist substantial shearing force.

U.S. Pat. No. 3,300,805 discloses a disposable rotary brush spacer ring in which the opposite ends of the strip used to form the ring have a respective slot and notched tab portion to seat and interlock with the slot to thereby hold the strip in the form of a ring.

The prior art devices require a separate member to lock a coil or bundle keeping device secured to a strand thereof when the keeping device is opened to release the coiled item for use. In accordance with the present invention, such interlocking means to hold the coil or bundle keeping device secured to a strand thereof when released for use are provided as an integral part of the coil or bundle keeper itself and does not require any separate member for that purpose.

The entire coil keeper and strand interlock in accordance with the present invention comprises a unitary elongated strap having fibrous loop elements throughout the entire portion of one surface and fibrous hook elements throughout the entire portion of the opposite surface to interlock with the fibrous loop elements when formed in a loop and one surface is overlapped with the other. The strand interlock, or single length interlock, is provided by a slot through the elongated strap at any desired intermediate location and a notch extending inwardly from one or both opposite side edges of the strap spaced apart from the slot a distance substantially equal to the circumference or peripheral cross-sectional dimension of the strand of electrical cord, or length of garden hose, or whatever the coil keeper in accordance with this invention is to be used with. The outer end of the strap closest to the notch is inserted in and drawn through the slot with the strand of electrical cord, or length of garden hose, or whatever within the loop formed thereby until the notch portion of the strap reaches the slot. The strap is then twisted so the axis of the notch extends normal to the axis of the slot, whereby solid portions of the strap alongside the slot seat in and interlock with the notch or notches extending inwardly from one or both sides of the strap. The loop thereby formed around the electrical cord, garden hose, or whatever has the same dimension between the notches and the slot as the circumference of the electrical cord, garden hose or whatever the device is to be used with so it is thereby held snugly thereto and interlocked in place thereon so it cannot fall off or become separated until the strap is twisted far enough to unseat from the notch or notches and to line up crosswise with the slot to enable it to be withdrawn.

Interlocking notches may be provided in the strap at more than one pre-selected spaced apart location from the slot, to enable use of a coil keeper in accordance with this invention with cords, garden hose and other items of varying circumference or peripheral cross-sectional dimension.

SUMMARY OF THE INVENTION

It is an object of the invention to provide a keeper for coiled items which comprises a single unitary strap having a two part interconnecting means, one part of which extends throughout one surface of the strap, the second part of which extends throughout the opposite surface of the strap for interconnection when the strap is looped with any part of one surface overlapping any part of the opposite surface, and which has interlocking means formed integrally therewith for securing the device to a portion of the coiled item to prevent separation therefrom when the item is released from the coil for use.

BRIEF DESCRIPTION OF THE DRAWING

Fig. 1 is a plan view of a keeper for coiled items in accordance with this invention.

FIG. 2 is a side elevation view of the keeper for coiled items shown in FIG. 1.

FIG. 3 is a plan view of a keeper for coiled items as shown in FIG. 1 but with a portion of an electrical cord held in the small interlockable loop of the keeper.

FIG. 4 is a side elevation view of the keeper and electrical cord, in section, held in the small interlockable loop of the keeper shown in FIG. 3.

DESCRIPTION OF PREFERRED EMBODIMENT

Figure 5:
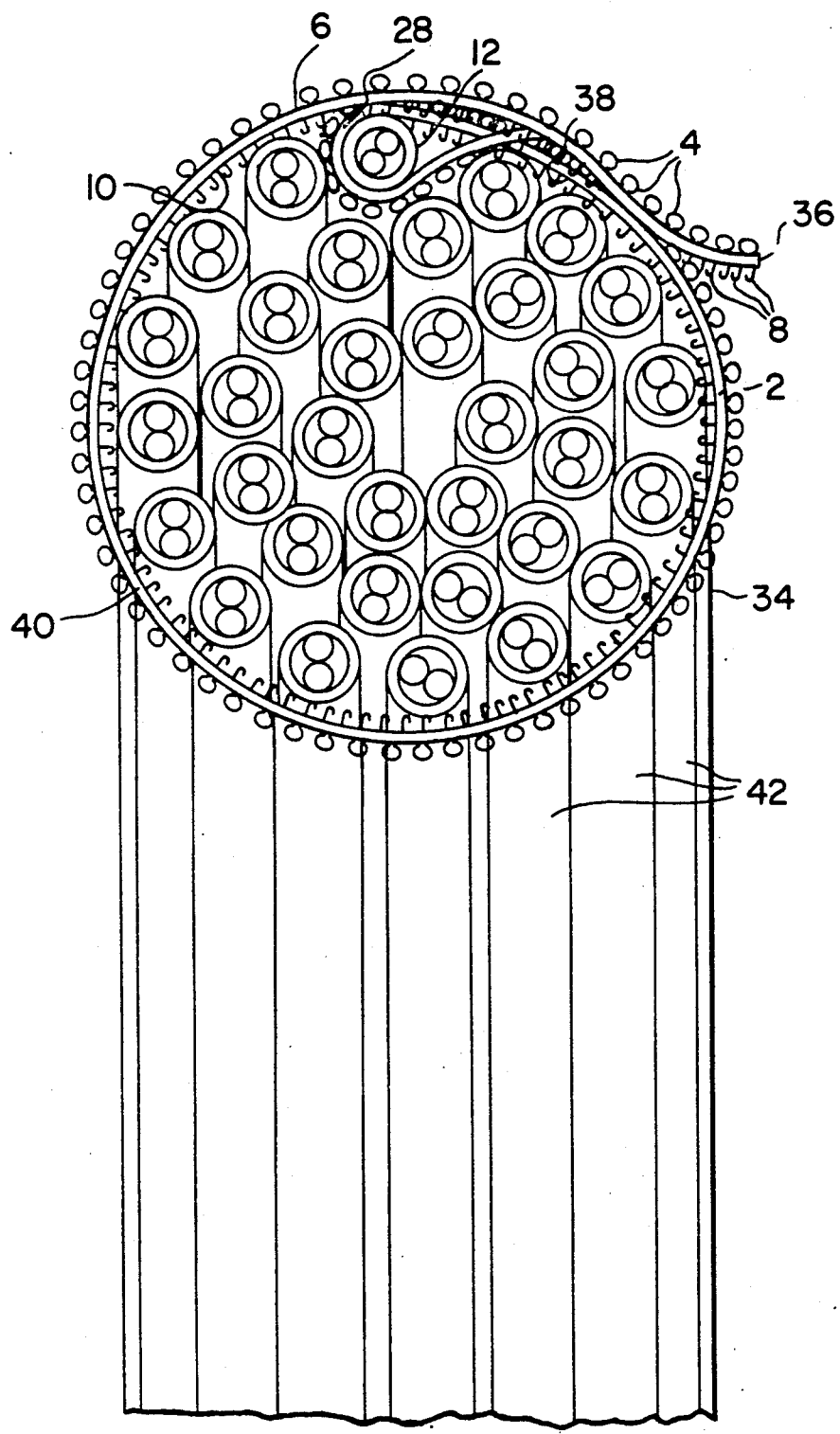
FIG. 5 is a side elevation view of the keeper in accordance with this invention with a coil of electrical cord, partly in section, held in the large releasably interconnecting loop of the keeper.

A keeper for coiled items in accordance with the present invention comprises an elongated strap 2 of flexible material having a plurality of fibrous loop elements 4 throughout one surface 6 of the strap 2 and a plurality of fibrous hook elements 8 throughout the opposite surface 10 of the strap 2.

The coil keeper in accordance with this invention may be used with any item that is gathered up into a coil or bundle when not in use, such as an electrical cord, a garden hose or the like. The construction may be the same for all, differing only in size. For purposes of description, reference in this specification will be made to use of the coil keeper with an electrical cord 12.

The coil keeper in accordance with this invention is secured to the electrical cord 12 by a two part interlock 14 comprising a longitudinally extending slot 16 and a laterally extending opposed pair of notches 18 and 20 extending inwardly from opposite side edges 22 and 24 of the strap 2 at a pre-determined spaced apart distance from the intermediate point 26 of the longitudinally extending slot 16.

Such pre-determined spaced apart distance is substantially equal to the outer circumference of the electrical cord 12 which is to be received within a loop 28 to be formed in the strap 2 between the longitudinal slot 16 and the laterally extending notches 18 and 20. When the loop 28 is formed, it fits snugly against and around the electrical cord 12 to keep the strap 2 secured thereto when the cord 12 is uncoiled and in use.

The longitudinally extending slot 16 has a longitudinal dimension somewhat greater than the cross-sectional dimension of the strap 2. A pair of relatively short laterally extending opposed slots 30 and 32 extend outwardly from longitudinal slot 16 at its intermediate point 26 for the respective opposed notches 18 and 20 to intermesh with when loop 28 is formed.

When the opposed notches 18 and 20 are intermeshed with the opposed laterally extending slots 30 and 32, the loop 28 is locked in place and can be neither loosened nor tightened until the strap 2 is twisted in such a way as to release the opposed notches 18 and 20 from the opposed laterally extending slots 30 and 32.

After use of the electrical cord 12 has been completed, it is rolled into a coil 34 as shown in FIG. 5, partially in section, and the strap 2 is wrapped around the coil. The free end 36 of the strap 2 is brought far enough around to overlap a portion of the opposite end region 38 of the strap 2. At such time, one of the surfaces 6 having the loops 4 or 10 having the hooks 8 of the overlapped free end portion 36 is facing the opposite surface of strap 2 of the overlapped portion of the opposite end region 38.

Thus, as shown in FIG. 5, when strap 2 is wrapped around the coil 34 with surface 6 having fibrous loops 4 facing outwardly, the overlapping portion of free end 36 has surface 10 with fibrous hooks 8 facing inwardly to releasably interconnect with fibrous loops 4 on surface 6 which are facing outwardly along the overlapped portion of opposite end region 38. The fibrous loops 4 and hooks 8 releasably interconnect when pressed into contact with each other to hold the opposite end regions of strap 2 together. When free end 36 of strap 2 is pulled away from the overlapped portion of opposite end region 38, the fibrous loops 4 and hooks 8 release, thereby opening the large loop 40 formed by strap 2 which extends laterally around the gathered loops 42 of the electrical cord 12 that make up the coil 34. The electrical cord 12 can then be uncoiled for use.

When electrical cord 12 is uncoiled for use, the strap 2 remains attached to electrical cord 12 by means of the interlocked loop 28. It is thereby available on the electrical cord 12 for use in forming the releasably interconnected large loop 40 to extend around the gathered loops 42 when cord 12 is coiled up for storage and to hold such coil 34 together until the electrical cord 12 is again put in use.

As stated above, the coil keeper in accordance with this invention can be used with any item that is rolled up into a coil when not in use and uncoiled when put to use. The strap 2 may be any desired length. The interlockable loop 28 may be any desired size to fit snugly around whatever item the coil keeper is to be used with, by appropriate spacing of the notches 18 and 20 from the intermediate point 26 at which lateral slots 30 and 32 intersect longitudinal slot 16.

Figure 6:
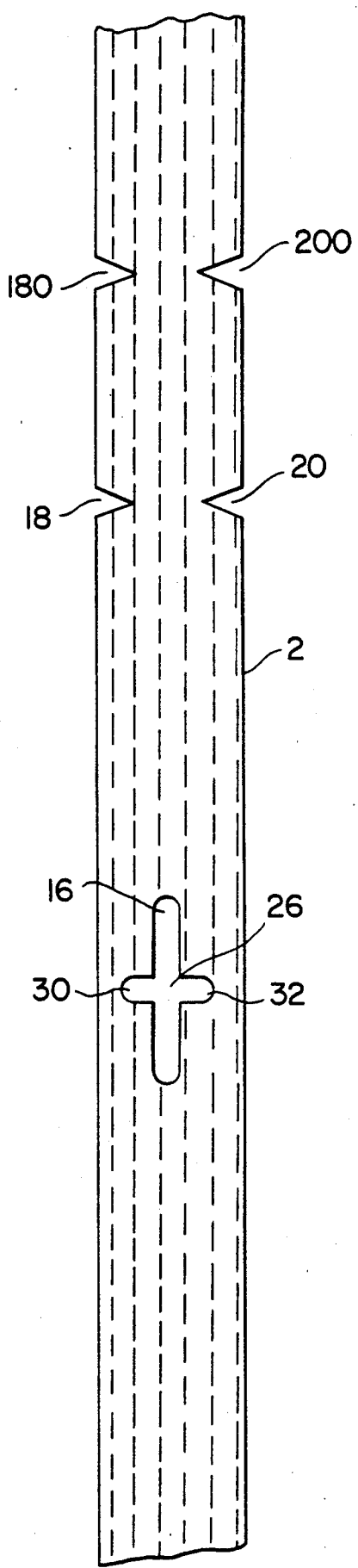
FIG. 6 a plan view of a fragment of a modified form of a keeper for coiled items in accordance with this invention in which the outer end portions are broken away.

The strap 2 may have more than one pair of notches 18 and 20, each pair spaced at different distances from the intermediate point 26 at which lateral slots 30 and 32 intersect longitudinal slot 16. FIG. 6 illustrates a modification of that kind, in which strap 2 has a first pair of opposed notches 18 and 20 spaced apart a first predetermined distance from intermediate point 26, and a second pair of opposed notches 180 and 200 spaced apart a second and farther predetermined distance from intermediate point 26 to fit snugly around a larger diameter item when interlockable loop 28 is formed by intermeshing opposed notches 180 and 200 in lateral slots 30 and 32.

Figure 7:
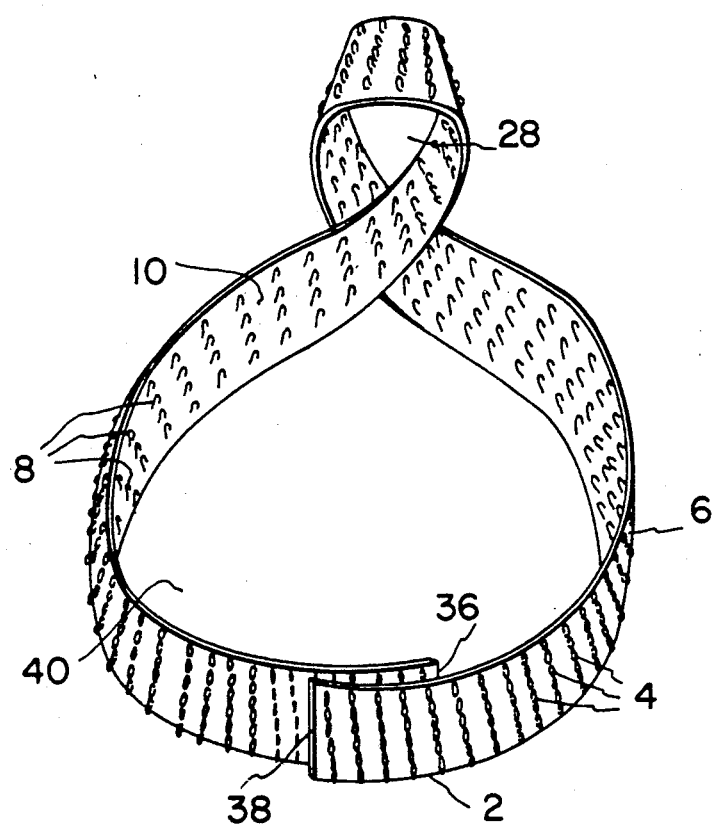
FIG. 7 is a perspective view of another modified form of the keeper in accordance with this invention.

Another modified form of the keeper in accordance with this invention is shown in FIG. 7. The strap 2 has fibrous loops 4 on and extending throughout its surface 6 from its end 36 to its opposite end 38, and fibrous hooks 8 on and extending throughout its opposite surface 10 from its end 36 to its opposite end 38. The fibrous loops 4 are releasably interconnectable with fibrous hooks 8 when brought into facing relationship and pressed together.

By providing such loops 4 and hooks 8 throughout the entire length of the strap 2 on opposite sides from end to end, the strap 2 can be twisted at any intermediate portion to bring loops 4 on surface 6 into facing relationship with hooks 8 on surface 10 to form a small loop 28 having a peripheral circumference corresponding to that of an electrical cord 12 or other item such as a garden hose and the like, to hold the strap snugly in place thereon.

The elongated portions of strap 2 which extend outwardly from the twisted portion that forms the small loop 28 can then be brought around to form a larger loop 40 to laterally surround the gathered loops of a coil of electrical cord 12 or other coiled item. The end 38 of strap 2 is brought around to overlap a portion of strap 2 which extends inwardly from its end 36. At such time as shown in FIG. 7, surface 6 having loops 4 extending inwardly from end 36 is in facing relationship with surface 10 having hooks 8 on the overlapping portion of strap 2 which extends inwardly thereof from end 38. The overlapped portions are pressed together whereby the hooks 8 and loops 4 releasably interconnect to hold the large loop in place to keep a coil of electrical cord or other item together in the coil until it is desired to release.

When the large loop 40 is released by separating the overlapped portions extending inwardly from ends 36 and 38 of the strap 2, the small loop 28 remains intact to retain the strap 2 on a portion of the electrical cord or other item until it is desired to use again to form large loop 40 to keep the electrical cord together in a coil.

I claim:

1. A keeper, comprising a single elongated flat flexible strap member extending in a single band between a first free end and a second free end having interlocking means to form a first interlockable loop and an interlock made by manipulating said elongated flexible strap member in an interlocking maneuver and releasable interconnecting means to make a second releasably interconnectable loop by a loop forming maneuver and a releasable interconnection simultaneously made with and by said same loop forming maneuver, wherein said interlocking means includes a longitudinally extending slot and a laterally extending notch spaced apart from said longitudinally extending slot a pre-determined distance, a portion of said flexible member extending through said longitudinally extending slot said pre-determined distance to form said first interlockable loop, said laterally extending notch at such point extending laterally of said longitudinal slot whereby opposite edge portions of said lateraly extending notch bear against corresponding portions of said flexible member adjacent said longitudinal slot to thereby provide an interlock to hold and lock said first interlockable loop in place until said interlocking means is unlocked.

2. A keeper as set forth in claim 1, wherein said predetermined distance said laterally extending notch is spaced apart from said longitudinally extending slot is selected to correspond to the cross-sectional circumference of an elongated, generally cylindrical coilable item with which said keeper is to be used whereby said first interlockable loop will fit snugly therearound when said elongated coilable item is received through said first interlockable loop.

3. A keeper, comprising a single elongated flat flexible strap member extending in a single band between a first free end and a second free end having interlocking means to form a first interlockable loop and an interlock made by manipulating said elongated flexible strap member in an interlocking maneuver and releasable interconnecting means to make a second releasably interconnectable loop by a loop forming maneuver and a releasable interconnection simultaneously made with and by said same loop forming maneuver, wherein said flexible member comprises a strap having a first end, an opposite second end, a first surface and an oppositely facing second surface, said releasable interconnecting means includes a plurality of loop elements extending from said first surface throughout from said first end of said strap to said second end thereof, a plurality of hook elements extending from said oppositely facing second surface throughout from said first end of said strap to said second end thereof, a first overlap portion of said strap extending inwardly thereof from said first end overlapping a second overlap portion of said strap extending inwardly thereof from said second end to form said second releasably interconnectable loop, one of said first and second surfaces of said first overlap portion of said strap facing the opposite one of said first and second surfaces of said second overlap portion of said strap whereby said plurality of hook elements extending from one of said surfaces of one of said overlap portions, contact and releasably interconnect with said plurality of loop elements extending from the opposite one of said surfaces of the other of said overlap portions to releasably hold said second releasably interconnectable loop in place until said releasable interconnecting means is releasably disconnected.

4. A keeper, comprising a single elongated flat flexible strap member extending in a single band between a first free end and a second free end having interlocking means to form a first interlockable loop and an interlock made by manipulating said elongated flexible strap member in an interlocking maneuver and releasable interconnecting means to make a second releasably interconnectable loop by a loop forming maneuver and a releasable interconnection simultaneously made with and by said same loop forming maneuver, wherein said interlocking means includes a longitudinally extending slot, a pair of opposed laterally extending slots opening to said longitudinally extending slot and extending laterally thereof, a pair of opposed laterally extending notches spaced apart a pre-determined distance from said longitudinally extending slot and said laterally extending slots at the point where said laterally extending slots open to said longitudinally extending slot, a portion of said flexible member extending through said longitudinally extending slot said pre-determined distance to form said first interlockable loop, said pair of laterally extending notches at such point extending laterally of said longitudinal slot to intermesh with said pair of laterally extending slots to thereby provide an interlock to hold and lock said first interlockable loop in place until said intermeshed laterally extending pairs of notches and slots are separated to enable withdrawal of said portion of said flexible member from said longitudinally extending slot.

5. A keeper, comprising a single elongated flat flexible strap member extending in a single band between a first free end and a second free end having interlocking means to form a first interlockable loop and an interlock made by manipulating said elongated flexible strap member in an interlocking maneuver and releasable interconnecting means to make a second releasably interconnectable loop by a loop forming maneuver and a releasable interconnection simultaneously made with and by said same loop forming maneuver, wherein said elongated flexible member comprises a strap having a first end, a second opposite end, a first side edge and a second opposite side edge, a first surface and an oppositely facing second surface, said interlocking means to form said interlockable loop comprises an elongated slot to receive said first end of said strap therethrough, a pair of short slots extending laterally from opposite sides of said elongated slot and opening thereto, and a pair of laterally extending notches extending inwardly of said strap from opposite ones of said first and second side edges thereof respectively, said notches being spaced apart from said elongated slot and said short slots extending therefrom in the direction toward said first end of said strap, said short slots being intermeshed with respective ones of said laterally extending notches when said first end of said strap is drawn through said elongated slot to form said first interlockable loop.

6. A keeper, comprising a single elongated flat flexible strap member extending in a single band between a first free end and a second free end having interlocking means to form a first interlockable loop and an interlock made by manipulating said elongated flexible strap member in an interlocking maneuver and releasable interconnecting means to make a second releasably interconnectable loop by a loop forming maneuver and a releasable interconnection simultaneously made with and by said same loop forming maneuver, wherein said elongated flexible member comprises a strap having a first end, a second opposite end, a first side edge and a second opposite side edge, a first surface and an oppositely facing second surface, said interlocking means to form said first interlockable loop being integrally formed with said strap, said releasable interconnecting means to form said second releasably interconnectable loop comprising a plurality of fibrous loops on said first surface of said strap extending inwardly thereof from its said first end and from its said second end, a plurality of fibrous hooks on said second surface of said strap extending inwardly thereof from its said first end and from its said second end, said fibrous loops and hooks being releasably interconnectable when brought into facing relationship and pressed together and releasable from each other when pulled apart.

7. A keeper comprising an elongated flexible strap having a first free end, an opposite second free end, a first surface and an oppositely facing second surface, a plurality of fibrous loops on said first surface of said strap extending from its said first free end to its said second free end, a plurality of fibrous hooks on said second surface of said strap extending from its said first free end to its said second free end, a first loop formed at an intermediate portion of said strap, said first loop comprising said strap twisted to bring one of said first and second surfaces into facing relationship with the other and in pressing relationship of said loops and hooks thereon respectively to provide interconnecting engagement with each other to hold said first loop in place, and a second loop, said second loop overlapping a first portion of said strap extending inwardly thereof from said first free end with a second portion of said strap extending inwardly thereof from said second free end to bring one of said first and second surfaces of said overlapping first and second portions into facing relationship with the other in pressing relationship of said loops and hooks thereon respectively to provide interconnecting engagement with each other to hold said second loop in place.

* * * * *